UNITED STATES PATENT OFFICE 2,143,941

PROCESS FOR INHIBITING POLYMERIZATION

John William Croom Crawford, Norton-on-Tees, England, assignor to Imperial Chemical Industries Limited, a corporation of Great Britain No Drawing. Application May 4, 1936, Serial No. 77,891. In Great Britain May 3, 1935

6 Claims. (Cl. 260—486)

(Granted under the provisions of sec. 14, act of March 2, 1927; 357 O. G. 5)

This invention relates to improvements in the manufacture and treatment of polymerizable unsaturated organic compounds and in particular acrylic acid, its homologues and derivatives, and methacrylic acid and its derivatives.

It is well known that many unsaturated aliphatic carboxylic acids, their esters and other derivatives, tend to polymerize on heating, forming masses of colloid material, and consequently yields of such materials in distillation or similar processes are considerably diminished. It has been proposed to inhibit this polymerization by the addition of a negative catalyst, for example, tannic acid, hydroquinone, copper or sulphur; while these agents are certainly effective, it is my experience that even in the presence of such materials some polymerization occurs to an extent varying considerably with the conditions.

According to the present invention polymerization on heating of acrylic acid and derivatives and homologues thereof, such as methacrylic acid and its esters, is inhibited by the addition of a small proportion of an anhydrous metal halide capable of combining with an oxygen-containing organic compound to form an oxonium compound.

Examples of suitable halides are antimony trichloride and pentachloride, arsenic trichloride and pentachloride, aluminum chloride, and potassium bismuth iodide. Usually not more than about 1% of these reagents suffices to effect the stabilization of the polymerizable compound, though in most cases much smaller amounts, e. g. 0.1% are effective. Preferably a compound is chosen which is not appreciably more volatile than the acid or ester, so that on distillation, or mere heating, the proportion of stabilizer in the liquid is not greatly decreased, and polymerization does not set in with further heating.

While these reagents are themselves efficient stabilizers, they may also be used in conjunction with other known negative catalysts; for example, a mixture of tannic acid and antimony trichloride, or of hydroquinone and arsenic pentachloride may be used.

In the following examples specific details for operating the present invention are described with comparative results showing the improvements obtained by the invention over previously known methods.

Example 1

Crude methacrylic acid obtained by hydrolysis of methacrylamide was distilled at a pressure of 15 mms. Hg. in the presence of 1% of hydroquinone and 77% of the methacrylic acid in the crude material was recovered. When the distillation was performed under similar circumstances but replacing the hydroquinone by 0.8% of antimony pentachloride, 88% of the acid was recovered.

Example 2

A batch of methyl methacrylate was divided into three portions. To one portion no addition was made, to the second 0.1% antimony pentachloride was added, and to the third 0.1% potassium bismuth iodide. All the three portions were heated at 70° C. for two hours and any insoluble polymer which had formed was then filtered off and weighed. In the case of the material without stabilizer 4% of the original weight was found as polymer, while only 0.07% resulted from the material stabilized with antimony pentachloride, and none at all from the sample having the added potassium bismuth iodide.

I claim:

1. In a process in which an alkyl methacrylate is subjected to heat the step which comprises inhibiting the polymerization during heating by the presence of from 0.1% to 1.0% of an anhydrous metal halide selected from the group consisting of the halides of antimony, arsenic, aluminum and bismuth.

2. A process for inhibiting the polymerization of methyl methacrylate during heat treatment which comprises inhibiting the polymerization of the methyl methacrylate during heating by the presence of from 0.1% to 1.0% of an anhydrous metal halide selected from the group consisting of the halides of antimony, arsenic, aluminum and bismuth.

3. A process for inhibiting the polymerization of methyl methacrylate during heat treatment which comprises inhibiting the polymerization of the methyl methacrylate during heating by the presence of substantially anhydrous antimony trichloride.

4. A process for inhibiting the polymerization of methyl methacrylate during heat treatment which comprises inhibiting the polymerization of the methyl methacrylate during heating by the presence of substantially anhydrous antimony trichloride and tannic acid.

5. A process for inhibiting the polymerization of methyl methacrylate during heat treatment which comprises inhibiting the polymerization of the methyl methacrylate during heating by the presence of from approximately 0.1% to 1.0% of substantially anhydrous antimony trichloride.

6. In a process in which a compound of the group consisting of acrylic acid and its esters and methacrylic acid and its esters is subjected to heat, the step which comprises inhibiting the polymerization during heating, of the compound of the group, by the presence of from 0.1% to 1.0% of an anhydrous metal halide selected from the group consisting of the halides of antimony, arsenic, aluminum and bismuth.

JOHN WILLIAM CROOM CRAWFORD.